United States Patent
Sakazi et al.

(10) Patent No.: US 12,373,568 B2
(45) Date of Patent: Jul. 29, 2025

(54) MALICIOUS ACTIVITY PROBABILITY DETERMINATIONS FOR AUTONOMOUS SYSTEMS

(71) Applicant: Microsoft Technology Licensing, LLC, Redmond, WA (US)

(72) Inventors: Shay Chriba Sakazi, Herzliya (IL); Andrey Karpovsky, Kiryat Motzkin (IL); Moshe Israel, Ramat Gan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 340 days.

(21) Appl. No.: 17/853,312

(22) Filed: Jun. 29, 2022

(65) Prior Publication Data
US 2024/0007490 A1     Jan. 4, 2024

(51) Int. Cl.
*G06F 21/57* (2013.01)
*H04L 9/40* (2022.01)
*H04L 41/142* (2022.01)

(52) U.S. Cl.
CPC .......... *G06F 21/577* (2013.01); *H04L 41/142* (2013.01); *H04L 63/1408* (2013.01); *H04L 63/1425* (2013.01)

(58) Field of Classification Search
CPC ............. H04L 63/1441; H04L 63/1433; H04L 63/1408; H04L 63/0272; G06F 21/577; G06F 21/552; G06F 21/316
See application file for complete search history.

(56) References Cited

U.S. PATENT DOCUMENTS 10,003,607 B1 * 6/2018 Kolman .............. H04L 63/1408
2014/0007238 A1   1/2014 Magee et al.

FOREIGN PATENT DOCUMENTS

| CN | 116827940 A | * | 9/2023 | |
| EP | 3793165 A1 | | 3/2021 | |
| WO | WO-2016164403 A1 | * | 10/2016 | ........... G06F 21/577 |
| WO | 2018164701 A1 | | 9/2018 | |

OTHER PUBLICATIONS

"Bad Ases", Retrieved From: https://www.silentpush.com/blog/bad-ases, Retrieved On: Jun. 29, 2022, 5 Pages.
Hu, et al., "An Alliance Based Reputation Model for Internet Autonomous System Trust Evaluation", In Proceedings of International Symposium on Parallel and Distributed Processing with Applications, Aug. 10, 2009, pp. 309-314.
"International Search Report and Written Opinion Issued in PCT Application No. PCT/US23/022797", Mailed Date: Aug. 25, 2023, 11 Pages.

* cited by examiner

*Primary Examiner* — Kyung H Shin

(57) ABSTRACT

According to examples, an apparatus may include a processor that may calculate a normalized threat intelligence score (TIS) for an autonomous system (AS) based on a sum of threat intelligence (TI) signals associated with Internet protocol (IP) addresses controlled by the AS and a count of the IP addresses controlled by the AS. The processor may also determine, based on the normalized TIS for the AS, a probability that activities associated with the IP addresses controlled by the AS are likely to be malicious. The processor may further output the determined probability that the activities associated with the IP addresses controlled by the AS are likely to be malicious.

20 Claims, 6 Drawing Sheets

MALICIOUS ACTIVITY PROBABILITY DETERMINATIONS FOR AUTONOMOUS SYSTEMS

BACKGROUND

Autonomous systems control or are otherwise responsible for the routing of respective sets of Internet protocol (IP) addresses. The autonomous systems may apply various routing policies to the respective sets of IP addresses under their control. Some of the routing policies may result in the autonomous systems providing greater levels of anomalous or malicious behavior detection over other routing policies.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
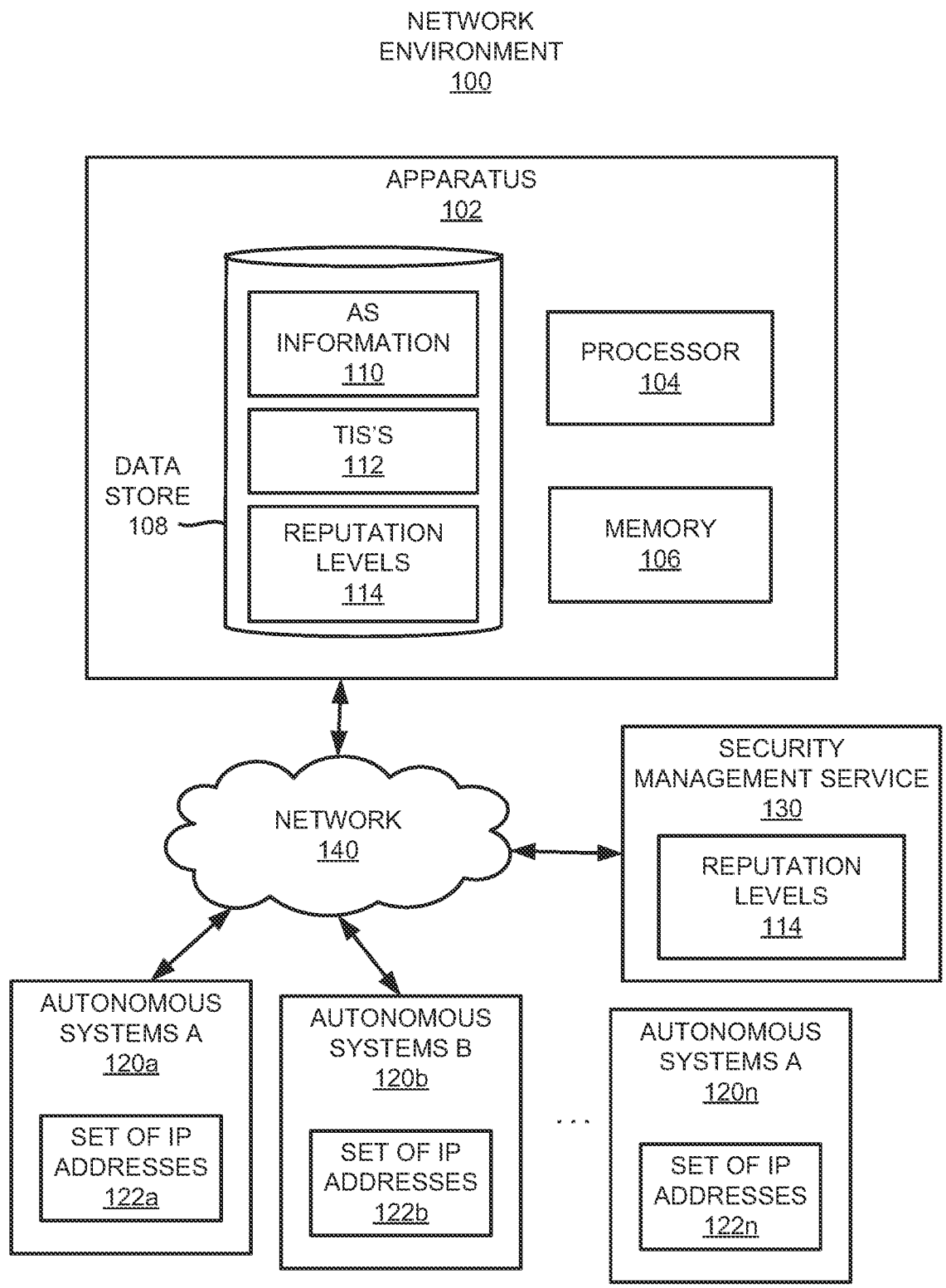
FIG. 1 shows a block diagram of a network environment, in which an apparatus may determine a reputation level of an autonomous system (AS) based on a calculated threat intelligence score (TIS) for the AS, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on. In the addition, the use of the terms "first," "second," "third," etc., are not intended to denote a specific order of elements, but instead are intended to distinguish the elements with respect to each other.

Threat intelligence signals are generated and collected when malicious activity is directly associated with some IP address. For instance, threat intelligence signals are generated and collected when, for instance, malware is downloaded, Command and Control communication is sent, and/or the like. In many instances, threat intelligence signals are collected per individual IP address with tagging information such as, activity type, time window, etc. As the threat intelligence signals are generated after the malicious activity has already occurred, threat intelligence signals may not be used to anticipate the occurrence of additional malicious activity. Additionally, as malicious actors may change IP addresses, merely blocking activity from certain IP addresses may not block the malicious activities from occurring. A technical issue associated with existing malicious activity detection techniques that utilize threat intelligence signals may be that such techniques may be unable to detect malicious activities before they occur and thus, the malicious activities may be propagated to multiple devices before they are detected and remedied.

Disclosed herein are apparatuses, methods, and computer-readable media that may determine a probability that activities associated with IP addresses controlled by an autonomous system (AS) are likely to be malicious, e.g., causing a TI signal to be generated. In other words, a processor of an apparatus disclosed herein may determine a reputation level of the AS, a probability that activities associated with the IP addresses are likely to be malicious, and/or the like. As discussed herein, the probability that activities associated with the IP addresses are likely to be malicious may be determined based on a normalized threat intelligence score (TIS) calculated for the AS. The TIS for the AS may be calculated based on an equation that includes a sum of threat intelligence (TI) signals associated with Internet protocol (IP) addresses controlled by the AS and a count of the IP addresses controlled by the AS.

According to examples, the reputation level of the AS, the probability of the TI signal being generated by an IP address controlled by the AS, and/or the probability that activities associated with the IP addresses controlled by the AS are likely to be malicious may be used to determine the likelihood that an anomalous or malicious activity associated with the IP addresses controlled by an AS will occur. Based on the determined likelihood, actions may be taken to prevent the occurrence or the spread of detected malicious activities. For instance, activities associated with IP addresses controlled by AS's having relatively low reputation levels may be flagged for greater scrutiny, may undergo greater security measures, security personnel may be alerted of the activities, the activities may be blocked, and/or the like. By way of particular example, data packets sent by those IP addresses may undergo a separate malware detection operation to thus prevent potentially malicious activities from occurring.

Through implementation of the features of the present disclosure; suspicious behavior or activities associated with the IP addresses controlled by certain AS's may proactively be detected and/or blocked. As a result, technical improvements afforded through implementation of the features of the present disclosure may include improvements in network security such as through the reduction of the occurrence and/or propagation of malicious attacks. Additionally, by determining which of the AS's pose greater threat levels and which of the AS's pose lesser threat levels, greater amounts of resources, such as processing and energy resources, may be directed to detecting malicious behavior in the AS's that pose the greatest threat levels. This may result in the reduction and/or optimization of resource utilization in detecting and/or block malicious activities.

Figure 2A:
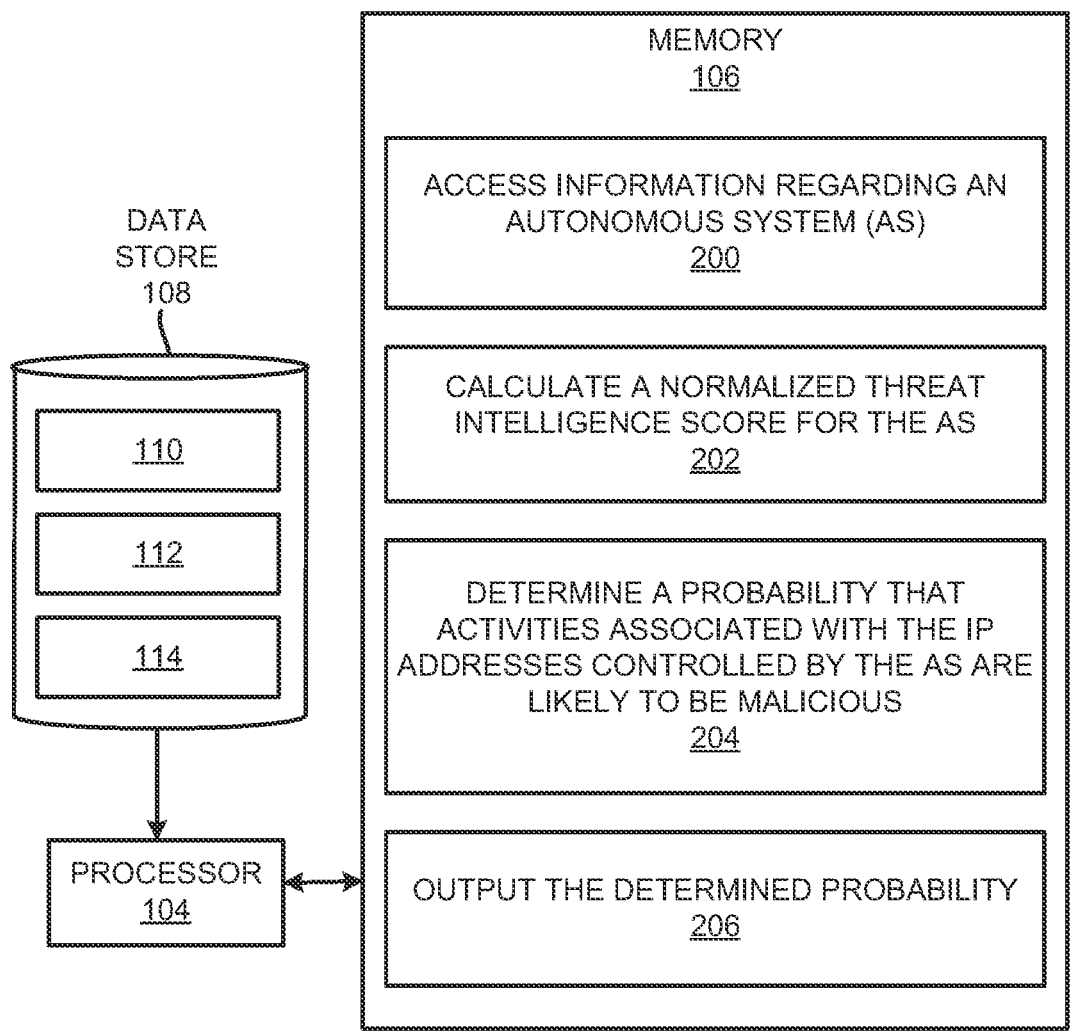
FIGS. 2A and 2B, respectively, depict block diagrams of the apparatus depicted in FIG. 1, in accordance with embodiments of the present disclosure.
Figure 2B:
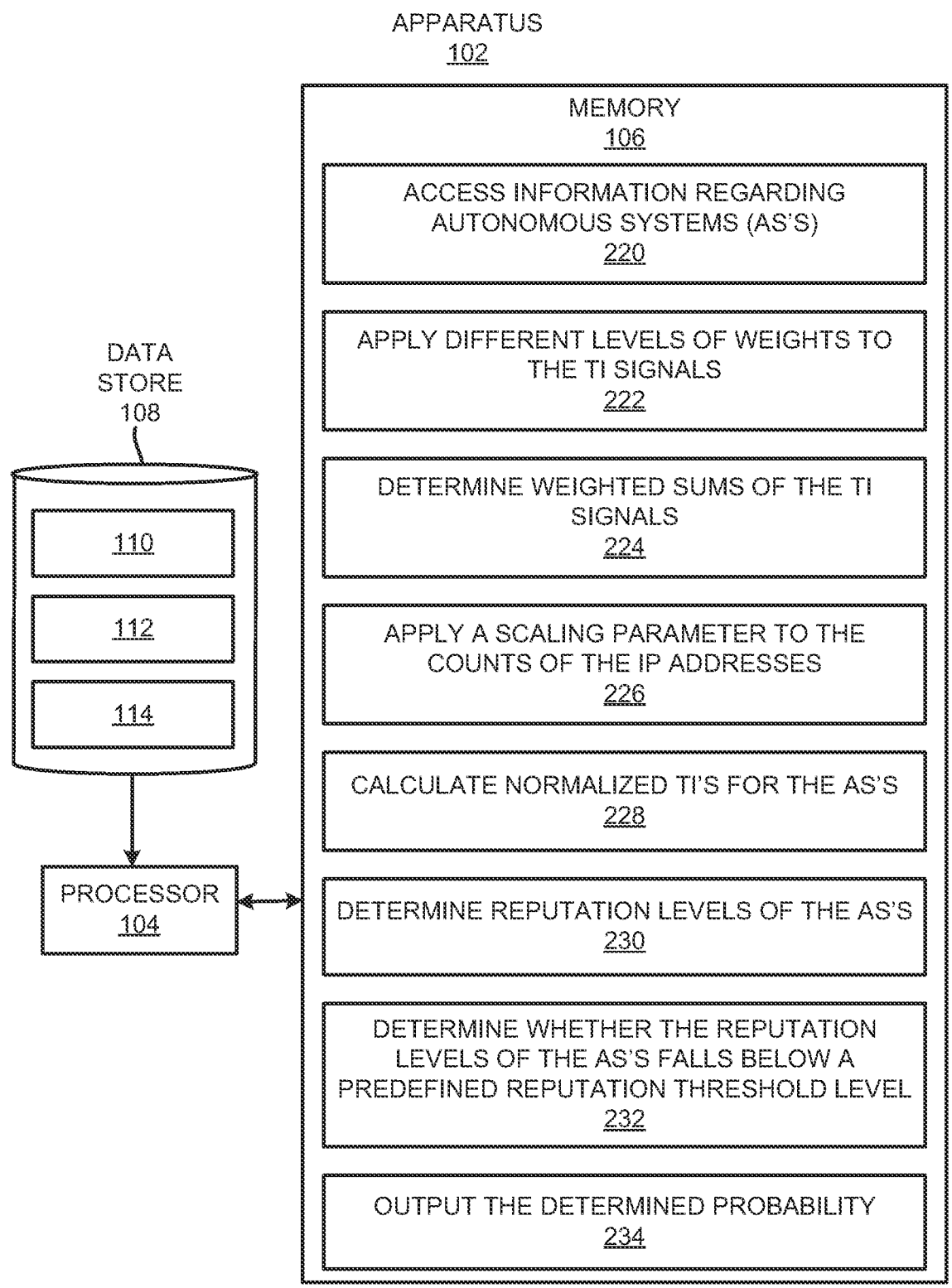

Reference is first made to FIGS. 1, 2A, and 2B. FIG. 1 shows a block diagram of a network environment 100, in which an apparatus 102 may determine a reputation level of an autonomous system (AS) based on a calculated threat intelligence score (TIS) for the AS, in accordance with an embodiment of the present disclosure. FIGS. 2A and 2B, respectively, depict block diagrams of the apparatus 102 depicted in FIG. 1, in accordance with embodiments of the present disclosure. It should be understood that the network environment 100 and the apparatus 102 may include additional features and that some of the features described herein may be removed and/or modified without departing from the scopes of the network environment 100 and/or the apparatus 102.

The apparatus 102 may be a type of computing device such as a server, a laptop computer, a desktop computer, a tablet computer, and/or the like. In some examples, the apparatus 102 may be part of a network environment 100 in which network activities, such as the communication of IP packets, access to data storage devices, etc., may occur. In addition or in other examples, the functionalities of and/or operations that the apparatus 102 may perform may be distributed across multiple servers, multiple virtual machines, and/or the like, on the cloud.

As shown in FIG. 1, the network environment 100 may also include, among other things, a plurality of AS's 120a-120n, in which the variable "n" represents a value greater than one. Each of the AS's 120a-120n may include a respective set of IP addresses 122a-122n that the AS's 120a-120n may control. That is, for instance, each of the AS's 120a-120n may apply their own routing policies to the sets of IP addresses 122a-122n respectively under their control. In addition, each of the AS's 120a-120n may be assigned a globally unique number, e.g., an autonomous system number (ASN) that may define each group of one or more IP prefixes assigned to the AS's 120a-120n, The AS's 120a-120n may use the ASN in Border Gateway Protocol (BGP) routing. It should be understood that the terms "AS" and "ASN" may be used interchangeably in the present disclosure.

As each of the AS's 120a-120n may apply its own routing policies to their respective sets of IP addresses 122a-122n, some AS's 120a-120n may apply more effective techniques for identifying and/or blocking anomalous, e.g., malicious, behavior among their sets of IP addresses 122a-122n than others. The differences in the routing policies may be due to the costs involved in setting up and maintaining effective malicious activity detection operations, the sizes of the AS's 120a-120n, business goals of the AS's 120a-120n, etc. In any regard, activities associated with the IP addresses 122a-122n in the AS's 120a-120n that employ relatively weaker malicious activity detection operations may have a greater risk of being malicious or including malicious content.

The apparatus 102 disclosed herein may determine reputation levels of the AS's 120a-120n such that the probabilities that the activities associated with the IP addresses 122a-122n under the control of the AS's 120a-120n are likely to be malicious may be determined based on the determined reputation levels. The apparatus 102 may output indications of the reputation levels and/or the probabilities that the activities associated with the IP addresses 122a-122n include malicious behavior to, for instance, a security management service 130. The security management service 130 may include a server or a group of servers that may be in the cloud and/or a computing device of a security personnel who may perform security functions based on the received information. For instance, the security personnel may cause activities associated with the IP addresses 122a-122n of AS's 120a-120n having relatively low reputation levels, e.g., are likely to be associated with malicious activities, to be blocked and/or flagged for additional security screening.

In some examples, the security management service 130 may perform various security management functions with respect to communications within and through the network environment 100. For instance, the security management service 130 may perform security information management services, security event management services, and/or the like. The security management service 130 may collect and aggregate relevant information corresponding to processes, e.g., data communications, data storage operations, malware detection operations, events and event identifiers, database events, network events, access to websites, and/or the like, occurring within or through the network environment 100. The security management service 130 may gather event and log data from users, applications, security devices and/or services, and/or the like.

As shown in FIG. 1, the apparatus 102 and the security management service 130 may each be connected to a network 140, which may be the Internet. IP packets, for instance, in the form of emails, web pages, applications, social media, etc., may be communicated to devices within the network environment 100 from sources that may use the IP addresses 122a-122n via the network 140. In instances in which the communications are identified as including malicious content, e.g., malware, Trojan horses, viruses, denial-of-service (DOS) attacks, a command and control communication, or the like, a threat intelligence (TI) signal may be generated. For instance, the security management service 130, or other security entity or software, may detect the occurrences of malicious activities from source IP addresses and may generate TI signals corresponding to the detected malicious activities. The TI signals may include or be tagged with, for instance, the IP address associated with the activity, an activity type, a time window of when the activity occurred, a severity of the activity, and/or the like. The TI signals may be aggregated and may be stored in a log, database, or other storage location.

Additional information regarding the AS's 120a-120n may also be stored. The additional information may include, for instance, a respective count; e.g., a number, of the IP addresses 122a-122n controlled by the AS's 120a-120n. The additional information may also include, the geographic locations of the AS's 120a-120n. In any regard, the processor 104 may access the information regarding the AS's 120a-120n through access to the logs of the information, a feed of the information, and/or the like. In some examples, the processor 104 may aggregate the information regarding the AS's 120a-120n and may determine respective sums of generated TI signals associated with IP addresses 122a-122n controlled by the AS's 120a-120n, counts of the IP addresses 122a-122n respectively controlled by each of the AS's, types of the TI signals generated due to activities by the IP addresses 122a-122n, severity levels of the activities identified in the generated TI signals, geographic locations of the AS's 120a-120n, and/or the like.

As shown in FIGS. 1, 2A, and 2B, the apparatus 102 may include a processor 104 that may control operations of the apparatus 102. The apparatus 102 may also include a memory 106 on which instructions that the processor 104 may access and/or may execute may be stored. In addition, the processor 104 may include a data store 108 on which the processor 104 may store various information. The processor 104 may be a semiconductor-based microprocessor, a central processing unit (CPU), an application specific integrated circuit (ASIC), a field-programmable gate array (FPGA), and/or other hardware device. The memory 106, which may also be termed a computer readable medium, may be, for example, a Random Access memory (RAM), an Electrically Erasable Programmable Read-Only Memory (EEPROM), a storage device, or the like. The memory 106 may be a non-transitory computer readable storage medium, where the term "non-transitory" does not encompass transitory propagating signals. In any regard, the memory 106 may have stored thereon machine-readable instructions that the processor 104 may execute. The data store 108 may also be a Random Access memory (RAM), an Electrically Erasable Programmable Read-Only Memory (EEPROM), a storage device, or the like.

Although the apparatus 102 is depicted as having a single processor 104, it should be understood that the apparatus 102 may include additional processors and/or cores without departing from a scope of the apparatus 102. In this regard, references to a single processor 104 as well as to a single memory 106 may be understood to additionally or alternatively pertain to multiple processors 104 and/or multiple memories 106. In addition, or alternatively, the processor 104 and the memory 106 may be integrated into a single component, e.g., an integrated circuit on which both the processor 104 and the memory 106 may be provided. In addition, or alternatively, the operations described herein as being performed by the processor 104 may be distributed across multiple apparatuses 102 and/or multiple processors 104.

With particular reference to FIG. 2A, the memory 106 may have stored thereon machine-readable instructions 200-206 that the processor 104 may execute. Although the instructions 200-206 are described herein as being stored on the memory 106 and may thus include a set of machine-readable instructions, the apparatus 102 may include hardware logic blocks that may perform functions similar to the instructions 200-206. For instance, the processor 104 may include hardware components that may execute the instructions 200-206. In other examples, the apparatus 102 may include a combination of instructions and hardware logic blocks to implement or execute functions corresponding to the instructions 200-206. In any of these examples, the processor 104 may implement the hardware logic blocks and/or execute the instructions 200-212. As discussed herein, the apparatus 102 may also include additional instructions and/or hardware logic blocks such that the processor 104 may execute operations in addition to or in place of those discussed above with respect to FIG. 2A. Moreover, although particular reference is made herein to a single AS 120a, it should be understood that the features discussed herein may equally apply to multiple ones of the AS's 120a-120n.

The processor 104 may execute the instructions 200 to access information 110 regarding an AS 120a. The information 110 may be stored in the data store 108. As discussed herein, the information 110 may include a sum of the TI signals associated with the IP addresses 122a-122n controlled by the AS 120a. That is, the information 110 may include a sum of the TI signals generated due to activities attributable to the IP addresses 122a-122n controlled by the AS 120a. The activities may include the sending of data packets over the network 140 in which the IP addresses 122a-122n are the source IP addresses of the data packet communications and the recipients are, for instance, IP addresses of destinations that are within the same domain as the apparatus 102. The TI signals in the sum of TI signals may include TI signals that were generated from a time when the data packets were received by the recipients in the domain of the apparatus 102. In other examples, the sum of TI signals may include TI signals that were generated over a certain period of time.

The information 110 may also include a count of IP addresses 122a controlled by the AS 120a. The count of the IP addresses 122a may include the total number of IP addresses 122a under the control of the AS 120a. The number of IP address 122a may be anywhere from a few hundred IP addresses 122a to billions of IP addresses depending upon the size of the AS 120a.

The processor 104 may execute the instructions 202 to calculate a normalized TIS 112 for the AS 120a based on the sum of the TI signals associated with IP addresses 122a controlled by the AS 120a and a count of the IP addresses 122a controlled by the AS 120a. Particularly, the processor 104 may calculate the normalized TIS 112 for the AS 120a using a logistic transformation of the sum of TI signals associated with the IP addresses 122a controlled by the AS 120a and the count of the IP addresses 122a controlled by the AS 120a. In other words, the processor 104 may calculate the normalized TIS 112 for the AS 120a as a transformation in which the TIS 112 is converted into a value between 0 and 1.

An example of an equation that the processor 104 may use to calculate the normalized TIS 112 is:

$$TIS = 1/1 + e^{\alpha s(0.5-t)}. \quad \text{Equation (1):}$$

In Equation (1), the value "e" may represent a Eulerian number, "$\alpha$" may represent a scaling parameter, "s" may represent a size or a count of the IP addresses 122a in the AS 120a, and "t" may represent the sum of the TI signals.

In some examples, the variable "t" in Equation (1) may represent a weighted sum of individual TI signals. In these examples, the individual TI signals may be weighted dependent upon the type of the TI signal such that greater weights may be applied to some types of TI signals while lesser weights may be applied to other types of TI signals. For instance, a greater weight may be applied to TI signals corresponding to greater severity levels than TI signals corresponding to lesser severity levels. By way of particular example, the TI signals corresponding to lesser severity levels may be given zero weight and thus, may not be included in the sum of TI signals used to calculate the TIS 112 for the AS 120a.

As other examples, the types of TI signals may not be based on the severity levels of the TI signals but instead, may be based on other ways of distinguishing the types of the TI signals. For instance, a first type of TI signal may include TI signals that were generated responsive to the detection of a malware being downloaded, a second type of TI signal may include TI signals that were generated responsive to the detection of a command and control communication being sent, a third type of TI signal may include TI signals that were generated responsive to the detection of phishing emails, etc. In any of these examples, the weighting applied to the individual TI signals may cause the individual TI signals of the various types to have differing effects on the sum of TI signals.

As yet other examples, the types of TI signals may be based on the geographic locations of the IP addresses that are the sources of the activities. For instance, the TI signals generated by activities associated with IP addresses in a certain geographic location may be assigned higher weights than IP addresses in other geographic locations. In any of these examples, the weights may be applied to filter the TI signals such that the TIS 112 is calculated using certain intended types of TI signals. As yet further examples, the types of TI signals may be based on the origins of the TI signals, such as whether the TI signals originated from activities on a cloud or on-premise.

The scaling parameter "α" may be applied to the count "s" of the IP addresses 122a, in which the scaling parameter "α" controls an impact of the count of the IP address on the TIS. In other words, the value of the scaling parameter "α" may control the steepness of a resulting sigmoid function, which represents the convergence rate of the metric to extreme values for different AS sizes. The weights applied to the TI signals and/or the value of the scaling parameter "α" may be user-defined, determined based on testing, determined based on modeling, and/or the like.

The processor 104 may execute the instructions 204 to determine, based on the normalized TIS 112 of the AS 120a, a probability that activities associated with IP addresses 122a controlled by the AS 120a are likely to be malicious. For instance, a higher normalized TIS 112 may be an indication that the AS 120a may have a higher probability that a connection from the AS 120a will be malicious and is thus more likely to cause a TI signal to be generated. Likewise, a lower normalized TIS 112 may be an indication that the AS 120a may have a lower probability that a connection from the AS 120a will be malicious and is thus less likely to cause a TI signal to be generated.

The processor 104 may execute the instructions 206 to output the determined probability that the activities associated with the IP addresses 122a controlled by the AS 120a are likely to be malicious. For instance, the processor 104 may output the determined probability to the security management service 130. The security management service 130 may take certain actions based on the determined probability. The certain actions may include the flagging of activities originating from the IP addresses 122a of the AS 120a to undergo greater security screening, preventing connections from the IP addresses 122a from being made, and/or the like.

In some examples, the processor 104 may determine whether the determined probability that the activities associated with the IP addresses controlled by the AS 120a are likely to be malicious exceeds a predefined threshold level. The predefined threshold level may be user-defined, based on testing, modeling, and/or the like. In addition, the processor 104 may output the determined probability based on the determined probability exceeding the predefined threshold level.

Reference is now made to FIG. 2B, which shows that the memory 106 may have stored thereon machine-readable instructions 220-234 that the processor 104 may execute. The instructions 220-234 may include a set of machine-readable instructions, hardware logic blocks, and/or the like. Moreover, although particular reference is made herein to a single AS 120a, it should be understood that the features discussed herein may equally apply to multiple ones of the AS's 120a-120n.

The processor 104 may execute the instructions 220 to access information 110 regarding a plurality of AS's 120a-120n. The processor 104 may thus access information 110 pertaining to the respective TI signals associated with the sets of IP addresses 122a-122n, the counts of the IP addresses 122a-122n in the AS's 120a-120n, the types of the TI signals, and/or the like.

The processor 104 may execute the instructions 222 to apply different levels of weights to the TI signals. As discussed herein, the different weight levels may be based on the types of the TI signals, e.g., the types of activities that caused the TI signals to be generated. In addition, the processor 104 may execute the instructions 224 to determine the weighted sums of the TI signals for each of the AS's 120a-120n. Moreover, the processor 104 may execute the instructions 226 to apply a scaling parameter to the counts of the respective IP addresses 122a-122n in the AS's 120a-120n.

The processor 104 may execute the instructions 228 to calculate normalized TIS's 112 for each of the AS's 120a based on the weighted sums of the TI signals and the counts of the IP addresses 122a-122n. That is, the processor 104 may calculate a normalized TIS 112 for each of the AS's 120a-120n individually based on the respective weighted sums of the TI signals and the respective counts of the IP addresses 122a-122n.

The processor 104 may execute the instructions 230 to determine reputation levels 114 of the AS's 120a-120n from the TIS's 112. In some examples, the processor 104 may group the AS's 120a-120n according their TIS's 112 and may determine how the AS's 120a-120n relate to each other from the groupings. For instance, the processor 104 may generate a histogram of the AS's 120a-120n according to the normalized TIS's 112 for the AS's 120a-120n. The processor 104 may also determine groups of the plurality of AS's 120a-120n from the histogram and may assign reputation levels to each of the plurality of AS's 120a-120n according to the groups in which the plurality of AS's 120a-120n are determined to belong.

For instance, the AS's 120a-120n having the lowest TIS's 112, e.g., lower than the $20^{th}$ percentile of the TIS's 112, may be assigned a top reputation levels. The AS's 120a-120n having the top reputation level may have caused no or very few TI signals to have been generated and thus, may have a very low probability of causing TI signals to be generated in the future. The AS's 120a-120n having higher TIS's 112, e.g., between the $20^{th}$ percentile and the $40^{th}$ percentile of the TIS's 112, may be assigned a high reputation level, in which a few TI signals have appeared and were likely dealt with quickly by the AS 120a-120n operator. The AS's 120a-120n having mediocre TIS's 112, e.g., between the $40^{th}$ percentile and the $60^{th}$ percentile of the TIS's 112, may be assigned a mediocre reputation level. The AS's 120a-120n having a mediocre reputation level may have had some TI signals appear recurringly in the AS's 120a-120n.

The AS's 120a-120n having low TIS's 112, e.g., between the $60^{th}$ and $80^{th}$ percentile of the TIS's 112, may be assigned the low reputation level. The AS's 120a-120n having the low reputation level may have had multiple TI signals appear frequently, in which at least some of the TI signals were high risk. The AS's 120a-120n having the highest TIS's 112, e.g., between the $80^{th}$ and $100^{th}$ percentile of the TIS's 112, may be assigned with the worst reputation level. The AS's 120a-120n having the worst reputation level may have a real probability (e.g., 0.05 or more) that any connection from the AS 120a-120n will be malicious and at least some flagged as high-risk TI signals at some point.

The processor 104 may execute the instructions 232 to determine whether the reputation levels of the AS's 120a-120n fall below a predefined reputation threshold level. In other words, the processor 104 may determine whether, any of the AS's 120-120n have been assigned reputation levels that fall below the predefined reputation threshold level.

The processor 104 may execute the instructions 234 to, for those AS's 120a-120n that have been assigned reputation levels that fall below the predefined reputation level, output an indication that the AS's 120a-120n have been assigned those reputation levels. In other words, the processor 104 may output the determined reputation levels of the AS's 120a-120n in response to a determination that the determined reputation levels fall below the predefined reputation threshold level. The predefined reputation threshold level may be user-defined, based on testing, based on modeling, based on a selected security level, and/or the like.

In some examples, the processor 104 may output the determined reputation levels 114 to the security management service 130. The security management service 130 or a security management personnel may use the reputation levels of the AS's 120a-120n to predict or otherwise determine the likelihood that activities associated with the IP addresses 122a-122n in the AS's 120a-120n may be malicious, e.g., cause a TI signal to be generated. In addition, the security management service 130 or the security management personnel may increase scrutiny on the AS's 120a-120n having lower reputation levels while decreasing scrutiny on the AS's 120a-120n having higher reputation levels. As a result, the application of resources to detect malicious behavior may better or more efficiently be allocated according to the levels of risk that the AS's 120a-120n pose.

Figure 3:
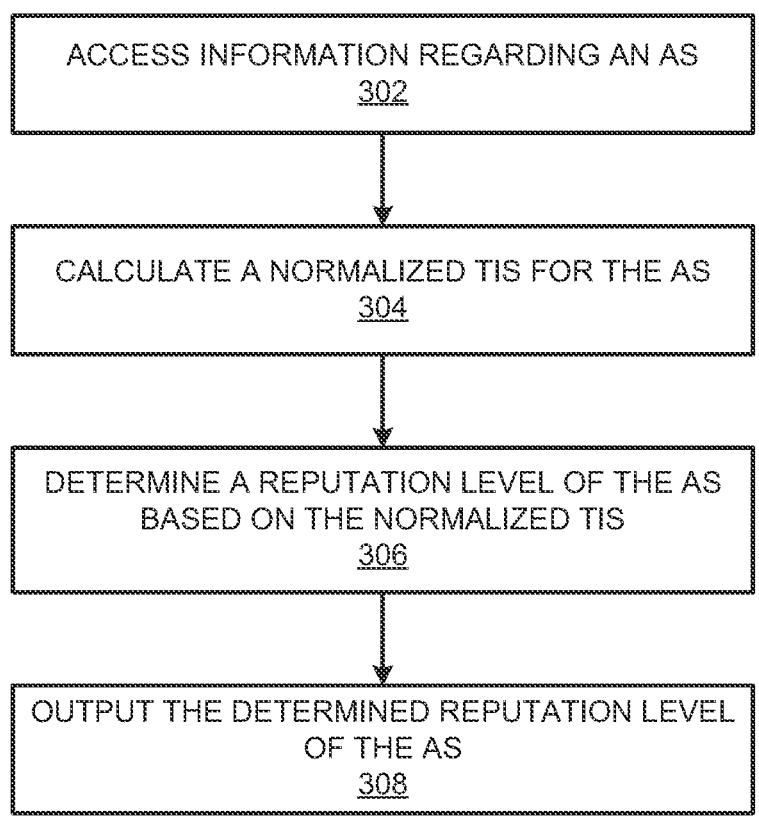
FIGS. 3 and 4, respectively, depict flow diagrams of methods for determining reputation levels of AS's based on normalized TIS's for the AS's, in which the normalized TIS's are calculated based on weighted sums of TI signals and counts of IP addresses in the AS's, in accordance with embodiments of the present disclosure.
Figure 4:
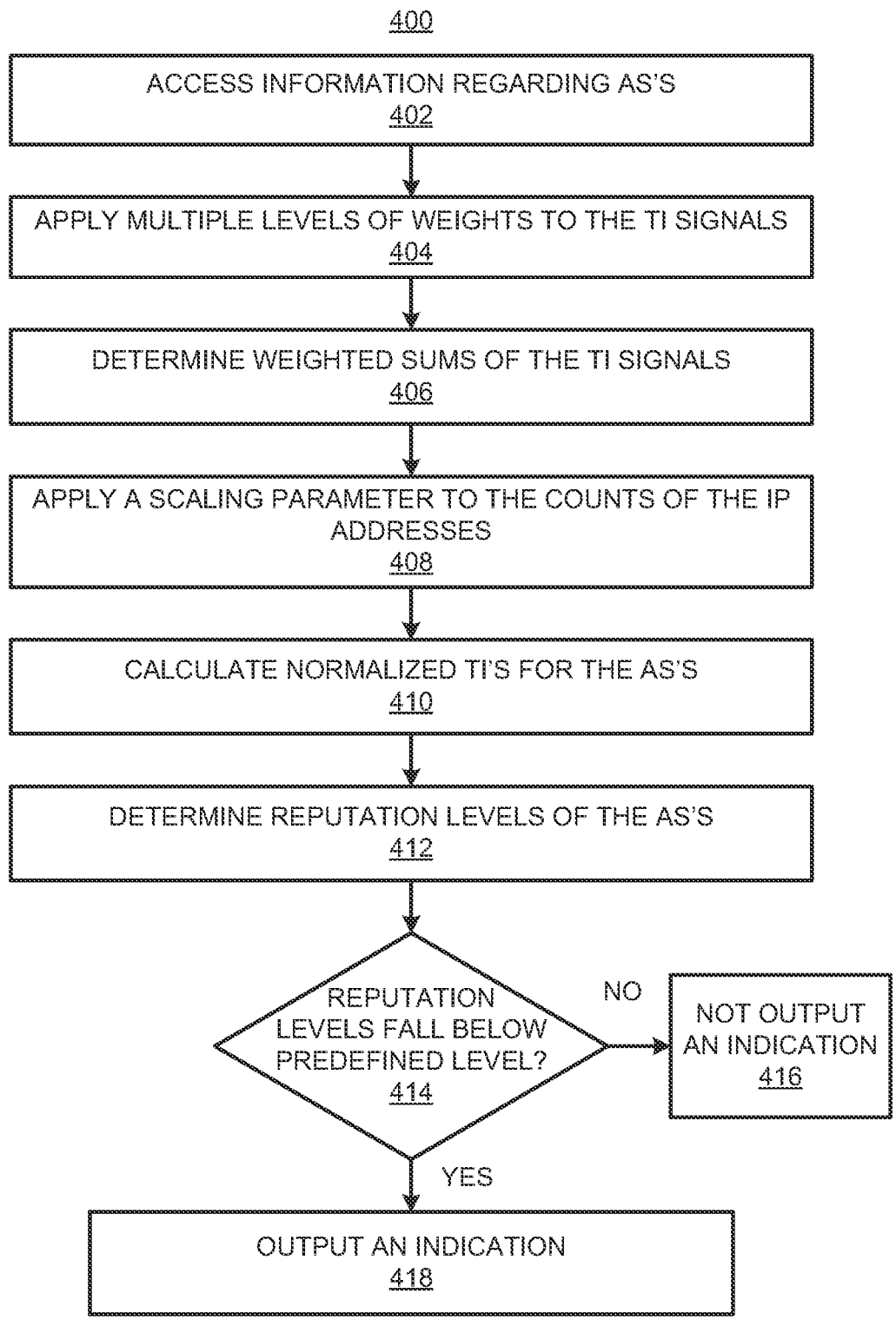

Various manners in which the processor 104 of the apparatus 102 may operate are discussed in greater detail with respect to the methods 300 and 400 depicted in FIGS. 3 and 4. Particularly, FIGS. 3 and 4, respectively, depict flow diagrams of methods 300, 400 for determining reputation levels of AS's 120a-120n based on normalized TIS's 112 for the AS's 120a-120n, in which the normalized TIS's 112 are calculated based on weighted sums of TI signals and counts of IP addresses 122a-122n in the AS's 120a-120n, in accordance with embodiments of the present disclosure. R should be understood that the methods 300 and 400 may include additional operations and that some of the operations described therein may be removed and/or modified without departing from the scopes of the methods 300 and 400. The descriptions of the methods 300 and 400 are made with reference to the features depicted in FIGS. 1, 2A, and 2B for purposes of illustration.

With reference first to FIG. 3, at block 302, the processor 104 may access information 110 regarding an AS 120a, the information 110 including TI signals associated with IP addresses 122a controlled by the AS 120a and a count of the IP addresses 122a controlled by the AS 120a. At block 304, the processor 104 may calculate a normalized TIS 112 for the AS 120a based on a weighted sum of the TI signals and the count of the IP addresses 122a controlled by the AS 120a. At block 306, the processor 104 may determine a reputation level of the AS 120a based on the normalized TIS 112 for the AS 120a. In addition, at block 308, the processor 104 may output the determined reputation level of the AS 120a.

In some examples, the processor 104 may determine whether the determined reputation level falls below a predefined reputation threshold level and may output the determined reputation level of the AS 120a in response to a determination that the determined reputation level falls below the predefined reputation threshold level. The processor 104 may also apply a scaling parameter and/or weights to the individual TI signals as discussed herein to calculate the TIS 112 of the AS 120a.

With reference first to FIG. 4, at block 402, the processor 104 may access information 110 regarding a plurality of AS's 120a-120n, the information 110 including TI signals associated with IP addresses 122a-122n controlled by the AS's 120a-120n and counts of the IP addresses 122a-122n controlled by the AS's 120a-120n. At block 404, the processor 104 may apply multiple levels of weights to the TI signals, for instance, based on the types of the TI signals as discussed herein. At block 406, the processor 104 may determine weighted sums of the TI signals. In addition, at block 408, the processor 104 may apply a scaling parameter to the counts of the IP addresses 122a-122n.

At block 410, the processor 104 may calculate normalized TIS's 112 for the AS's 120a-120n based on the weighted sums of the TI signals and the counts of the IP addresses 122a-122n controlled by the AS's 120a-120n. At block 412, the processor 104 may determine reputation levels of the AS's 120a-120n based on the normalized TIS's 112 for the AS's 120a-120n.

At block 414, the processor 104 may determine whether the determined reputation levels fall below a predefined reputation threshold level. For those AS's 120a-120n having reputation levels that exceed the predefined reputation threshold level, at block 416, the processor 104 may not output an indication of their reputation levels. However, for those AS's 120a-120n having reputation levels that fall below the predefined reputation threshold level, at block 418, the processor 104 may output the determined reputation level of those AS's.

Some or all of the operations set forth in the methods 300 and 400 may be included as utilities, programs, or subprograms, in any desired computer accessible medium. In addition, the methods 300 and 400 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 5:
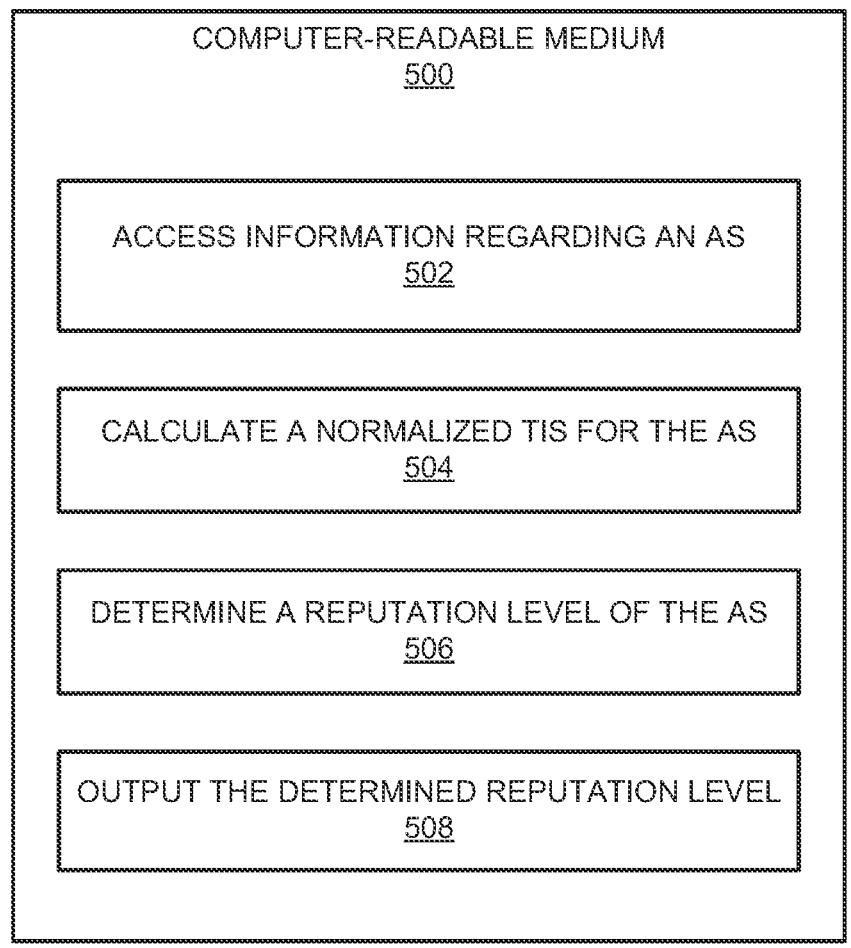
FIG. 5 shows a block diagram of a computer-readable medium that may have stored thereon computer-readable instructions for determining a reputation level of an AS based on a normalized TIS for the AS, in which the normalized TIS is calculated based on a weighted sum of TI signals and a count of IP addresses in the AS, in accordance with an embodiment of the present disclosure.

Turning now to FIG. 5, there is shown a block diagram of a computer-readable medium 500 that may have stored thereon computer-readable instructions for determining a reputation level of an AS 120a based on a normalized TIS 112 for the AS 120a, in which the normalized TIS 112 is calculated based on a weighted sum of TI signals and a count of IP addresses 122a in the AS 120a, in accordance with an embodiment of the present disclosure. It should be understood that the computer-readable medium 500 depicted in FIG. 5 may include additional instructions and that some of the instructions described herein may be removed and/or modified without departing from the scope of the computer-readable medium 500 disclosed herein. The computer-readable medium 500 may be a non-transitory computer-readable medium, in which the term "non-transitory" does not encompass transitory propagating signals.

The computer-readable medium 500 may have stored thereon computer-readable instructions 502-508 that a processor, such as a processor 104 of the apparatus 102 depicted in FIGS. 1, 2A, and 2B, may execute. The computer-readable medium 500 may be an electronic, magnetic, optical, or other physical storage device that contains or stores executable instructions. The computer-readable medium 500 may be, for example, Random Access memory (RAM), an Electrically Erasable Programmable Read-Only Memory (EEPROM), a storage device, an optical disc, and the like.

The processor may fetch, decode, and execute the instructions 502 to access information 110 regarding an AS 120a, the information 110 including TI signals associated with IP addresses 122a controlled by the AS 120a and a count of the IP addresses 122a controlled by the AS 120a. The processor may fetch, decode, and execute the instructions 504 to calculate a normalized TIS 112 for the AS 120a based on a weighted sum of the TI signals and the count of the IP addresses 122a controlled by the AS 120a.

In some examples, the processor may apply different levels of weights to the TI signals depending upon the types of the TI signals and may determine the weighted sum of TI signals based on the levels of weights applied to the TI signals. The processor may also calculate the normalized TIS 112 for the AS 120a using a logistic transformation of the weighted sum of TI signals associated with the IP addresses 122a controlled by the AS 120a and the count of the IP addresses 122a controlled by the AS 120a. The processor may further apply a scaling parameter to the count of the IP addresses 122a controlled by the AS 120a, in which the scaling parameter controls an impact of the count of the IP addresses 122a on the TIS 112.

The processor may fetch, decode, and execute the instructions 506 to determine a reputation level of the AS 120a based on the normalized TIS 112 for the AS 120a. In addition, the processor may fetch, decode, and execute the instructions 508 to output the determined reputation level of the AS.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents in which all terms are meant in their broadest reasonable sense unless otherwise indicated.

What is claimed is:

1. An apparatus comprising:
   a processor; and
   a memory on which is stored machine-readable instructions that when executed by the processor, cause the processor to:
   determine a count of Internet Protocol (IP) addresses controlled by an autonomous system (AS);
   generate threat intelligence (TI) signals for a subset of the IP addresses controlled by the AS based on detected malicious activity;
   calculate a normalized threat intelligence score (TIS) for the AS based on a sum of the TI signals associated with the IP addresses controlled by the AS and the determined count of the IP addresses controlled by the AS;
   determine, based on the normalized TIS for the AS, a probability that activities associated with the IP addresses controlled by the AS are likely to be malicious; and
   output the determined probability that the activities associated with the IP addresses controlled by the AS are likely to be malicious.

2. The apparatus of claim 1, wherein the instructions cause the processor to:
   calculate the normalized TIS for the AS using a logistic transformation of the sum of TI signals associated with the IP addresses controlled by the AS and the determined count of the IP addresses controlled by the AS.

3. The apparatus of claim 1, wherein the instructions cause the processor to:
   calculate the normalized TIS for the AS using a logistic transformation of a weighted sum of TI signals associated with the IP addresses controlled by the AS and the determined count of the IP addresses controlled by the AS.

4. The apparatus of claim 3, wherein the instructions cause the processor to:
   apply different levels of weights to the TI signals dependent upon types of the TI signals; and
   determine the weighted sum of TI signals based on the levels of weights applied to the TI signals.

5. The apparatus of claim 1, wherein the instructions cause the processor to:
   apply a scaling parameter to the determined count of the IP addresses controlled by the AS, wherein the scaling parameter controls an impact of the count of the IP addresses on the TIS.

6. The apparatus of claim 5, wherein the instructions cause the processor to:
   apply a certain scaling parameter to the count of the IP addresses based on a geographic location of the AS.

7. The apparatus of claim 1, wherein the instructions cause the processor to:
   calculate normalized TIS's for a plurality of AS's;
   determine, based on the normalized TIS's for the plurality of AS's and for each of the plurality of AS's, a probability that activities associated with IP addresses controlled by the AS are likely to be malicious; and
   output the determined probabilities of the activities associated with the IP addresses controlled by the AS's are likely to be malicious.

8. The apparatus of claim 7, wherein the instructions cause the processor to:
   generate a histogram of the AS's according to the normalized TIS's for the plurality of AS's;
   determine groups of the plurality of AS's from the histogram; and
   assign reputation levels to each of the plurality of AS's according to the groups in which the plurality of AS's are determined to belong.

9. The apparatus of claim 1, wherein the instructions cause the processor to:
   determine whether the determined probability that the activities associated with the IP addresses controlled by the AS are likely to be malicious exceeds a predefined threshold level; and
   output the determined probability based on the determined probability exceeding the predefined threshold level.

10. A method comprising:
    accessing, by a processor, a count of Internet Protocol (IP) addresses controlled by an autonomous system (AS);
    generating, by a processor, threat intelligence (TI) signals for a subset of IP addresses controlled by the AS based on detected malicious activity;
    accessing, by a processor, information regarding the AS, the information including the TI signals associated with the IP addresses controlled by the AS and a count of the IP addresses controlled by the AS;

calculating, by the processor, a normalized threat intelligence score (TIS) for the AS based on a weighted sum of the TI signals and the count of the IP addresses controlled by the AS;

determining, by the processor, a reputation level of the AS based on the normalized TIS for the AS; and outputting, by the processor, the determined reputation level of the AS.

11. The method of claim 10, further comprising:

determining whether the determined reputation level falls below a predefined reputation threshold level; and outputting the determined reputation level of the AS in response to a determination that the determined reputation level falls below the predefined reputation threshold level.

12. The method of claim 10, further comprising:

calculating the normalized TIS for the AS using a logistic transformation of the weighted sum of TI signals associated with the IP addresses controlled by the AS and the count of the IP addresses controlled by the AS.

13. The method of claim 12, further comprising:

applying different levels of weights to the TI signals depending upon the types of the TI signals; and determine the weighted sum of TI signals based on the levels of weights applied to the TI signals.

14. The method of claim 12, further comprising:

applying a scaling parameter to the count of the IP addresses controlled by the AS, wherein the scaling parameter controls an impact of the count of the IP addresses on the TIS.

15. The method of claim 10, further comprising:

accessing information regarding a plurality of AS's, the information including TI signals associated with IP addresses controlled by the plurality of AS's and counts of the IP addresses controlled by the plurality of AS's;

calculating normalized TIS's for the plurality of AS's;

determining, based on the normalized TIS's for the plurality of AS's and for each of the plurality of AS's, a reputation level of the AS; and outputting the determined reputation levels of the AS's.

16. The method of claim 15, further comprising:

generating a histogram of the AS's according to the normalized TIS's for the plurality of AS's;

determining groups of the plurality of AS's from the histogram; and assigning reputation levels to each of the plurality of AS's according to the groups in which the plurality of AS's are determined to belong.

17. A non-transitory computer-readable medium on which is stored a plurality of instructions that when executed by a processor, cause the processor to:

access a count of Internet Protocol (IP) addresses controlled by an autonomous system (AS);

generate threat intelligence (TI) signals for a subset of the IP addresses controlled by the AS based on detected malicious activity;

access information regarding the AS, the information including the TI signals associated with the IP addresses controlled by the AS and a count of the IP addresses controlled by the AS;

calculate a normalized threat intelligence score (TIS) for the AS based on a weighted sum of the TI signals and the count of the IP addresses controlled by the AS;

determine a reputation level of the AS based on the normalized TIS for the AS; and output the determined reputation level of the AS.

18. The computer-readable medium of claim 17, wherein the instructions cause the processor to:

determine whether the determined reputation level falls below a predefined reputation threshold level; and output the determined reputation level of the AS in response to a determination that the determined reputation level falls below the predefined reputation threshold level.

19. The computer-readable medium of claim 17, wherein the instructions cause the processor to:

apply different levels of weights to the TI signals depending upon the types of the TI signals;

determine the weighted sum of TI signals based on the levels of weights applied to the TI signals; and calculate the normalized TIS for the AS using a logistic transformation of the weighted sum of TI signals associated with the IP addresses controlled by the AS and the count of the IP addresses controlled by the AS.

20. The computer-readable medium of claim 17, wherein the instructions cause the processor to:

apply a scaling parameter to the count of the IP addresses controlled by the AS, wherein the scaling parameter controls an impact of the count of the IP addresses on the TIS.

* * * * *